(12) United States Patent
Darragh et al.

(10) Patent No.: US 8,992,848 B2
(45) Date of Patent: Mar. 31, 2015

(54) APPARATUS FOR DELIVERING ELECTROMAGNETIC ENERGY INTO A SOLUTION

(76) Inventors: Austin Darragh, Dunsany (IE); David Darragh, Shankill (IE)

( * ) Notice: Subject to any disclaimer, the term of this patent is extended or adjusted under 35 U.S.C. 154(b) by 832 days.

(21) Appl. No.: 13/126,630

(22) PCT Filed: Apr. 1, 2009

(86) PCT No.: PCT/EP2009/002379
§ 371 (c)(1),
(2), (4) Date: Jun. 28, 2011

(87) PCT Pub. No.: WO2010/049013
PCT Pub. Date: May 6, 2010

(65) Prior Publication Data
US 2011/0268614 A1 Nov. 3, 2011

(30) Foreign Application Priority Data
Oct. 31, 2008 (IE) .................... S2008/0879

(51) Int. Cl.
*B01J 19/12* (2006.01)
*B01J 19/08* (2006.01)
*C02F 1/48* (2006.01)
*C02F 1/02* (2006.01)

(52) U.S. Cl.
CPC ............... *B01J 19/087* (2013.01); *B01J 19/12* (2013.01); *B01J 19/129* (2013.01); *B01J 2219/0803* (2013.01); *B01J 2219/0871* (2013.01); *B01J 2219/0877* (2013.01); *B01J 2219/1203* (2013.01); *C02F 1/02* (2013.01); *C02F 1/48* (2013.01); *C02F 2201/483* (2013.01)

USPC . 422/186; 422/186.29; 210/243; 210/748.01; 204/164

(58) Field of Classification Search
CPC ........ C02F 1/02; C02F 1/48; C02F 2201/483; B01J 19/087; B01J 19/12; B01J 19/129; B01J 2219/0803; B01J 2219/0871; B01J 2219/0877; B01J 2219/1203
USPC ................ 422/186–186.04, 186.29; 210/243; 210/748.01; 204/106, 164
See application file for complete search history.

(56) References Cited

U.S. PATENT DOCUMENTS

| 6,193,878 B1 | 2/2001 | Morse | |
|---|---|---|---|
| 6,579,231 B1 * | 6/2003 | Phipps | .......................... 600/300 |
| 2001/0035342 A1 | 11/2001 | Morse | |
| 2003/0121862 A1 * | 7/2003 | Holland | ........................ 210/695 |

(Continued)

FOREIGN PATENT DOCUMENTS

WO    WO 97/07978    3/1997

Primary Examiner — Shogo Sasaki
(74) Attorney, Agent, or Firm — Raymond A. Nuzzo

(57) ABSTRACT

The present invention relates to a delivery apparatus for delivering electromagnetic energy into a solution. The delivery apparatus comprises a coil means arranged within an outer housing for delivering a magnetic field into the solution, a voltage assembly means coupled to the coil means for delivering an electric field into the solution, and connection means for delivering an electromagnetic signal to the coil from electromagnetic signal generation circuitry contained within the housing. The arrangement of the present invention confers significant physical stability on the delivery apparatus and ensures that heat generated by heat generating components of the apparatus is conducted away from the electromagnetic signal generation circuitry so that the apparatus can be operated continuously.

15 Claims, 14 Drawing Sheets

(56) References Cited

U.S. PATENT DOCUMENTS

2003/0160000 A1* 8/2003 Holland ................ 210/695
2005/0161405 A1* 7/2005 Holland ................ 210/695
2007/0051685 A1* 3/2007 Wittmer et al. ........ 210/695
2007/0272621 A1* 11/2007 Dresty, Jr. ............ 210/748

* cited by examiner

APPARATUS FOR DELIVERING ELECTROMAGNETIC ENERGY INTO A SOLUTION

The present invention relates to an apparatus for delivering electromagnetic energy into a solution to modify characteristics of the solution, particularly, the Zeta potential of the solution.

It is known that the delivery of electromagnetic energy (such as radio frequency (RF) modulated energy) into a solution can be used to modify characteristics of the solution, such as the Zeta potential. The delivery of RF modulated energy into a solution is typically carried out by placing a delivery apparatus, which is driven by an RF energy source to generate magnetic and electric field energy, suitably near or in the solution. The characteristics of the solution are altered according to the amplitude of and the length of time that the RF modulated energy is delivered into the solution.

WO-A-9622831 discloses one such apparatus for delivering electromagnetic energy into a solution. Preferred embodiments of delivery apparatus disclosed in this document comprise a tubular housing having closed ends forming a water tight chamber, a coil contained within the chamber delivering a magnetic field into a solution, at least one electric field probe coupled to the coil for delivering an electric field into the solution and coupling means for coupling an electromagnetic signal to the coil. Although this apparatus is useful, it suffers from a number of drawbacks, including that the arrangement disclosed generates significant heat which interferes with the frequency and amplitude of the signal generated and causes it to fluctuate about the preferred optimal radio frequency energy level. In an attempt to control the level of undesirable heat dissipation the unit operates intermittently and thereby defines a duty cycle. Furthermore, on-off control of the delivery apparatus disclosed in WO-A-9622831 requires a user to be physically present at the apparatus so as to manually operate a switch, which is disadvantageous. Additionally, the tubular housing is permanently sealed so that the internal components, such as the coil, the probes and the like, are unable to be accessed without first breaking the sealed tubular housing. Accordingly, should the unit breakdown and/or require maintenance it is necessary to break the outer housing in order to access the internal components and then apply a new outer housing to the unit.

It is an object of the present invention to provide a delivery apparatus which goes at least some way toward overcoming the above problems and/or which will provide the public and/or industry with a useful alternative.

It is acknowledged that the term 'comprise' may, under varying jurisdictions be provided with either an exclusive or inclusive meaning. For the purpose of this specification, and unless otherwise noted explicitly, the term comprise shall have an inclusive meaning—i.e. that it may be taken to mean an inclusion of not only the listed components it directly references, but also other non-specified components. Accordingly, the term 'comprise' is to be attributed with as broader interpretation as possible within any given jurisdiction and this rationale should also be used when the terms 'comprised' and/or 'comprising' are used.

Further aspects of the present invention will become apparent form the ensuing description which is given by way of example only.

According to the invention, there is provided a delivery apparatus for delivering electromagnetic energy into a solution, the delivery apparatus comprising:

an outer housing;

a coil means arranged within the housing for delivering a magnetic field into the solution;

voltage assembly means coupled to the coil means for delivering an electric field into the solution;

connection means for delivering an electromagnetic signal to the coil from electromagnetic signal generation circuitry contained within the housing;

characterised in that the delivery apparatus further comprises heat conducting means arranged within the housing to conduct heat generated by heat generating components of the electromagnetic signal generation circuitry.

The present invention encapsulates all of the components of the apparatus within the housing and this arrangement confers significant physical stability on the delivery apparatus. The provision of heat conducting means within the housing will ensure that heat generated by heat generating components of the electromagnetic signal generation circuitry, such as one or more FET transistors, will be conducted away to thereby significantly reduce overheating of the apparatus and minimise the level of undesirable heat dissipation. As a result, the present invention does not need to be operated intermittently in order to control the level of heat dissipation to maintain a constant frequency and amplitude of the signal generated.

In another embodiment of the invention, the heat conducting means at least partially encloses the electromagnetic signal generation circuitry.

Preferably, the heat generating components of the electromagnetic signal generation circuitry are in contact with the heat conducting means.

In another embodiment of the invention, the apparatus further comprises shielding means arranged within the housing to at least partially enclose the coil means so as to shield the coil means from electrostatic fields. The provision of such shielding means within the housing provides the desired electrostatic shielding whilst still allowing the electromagnetic field generated by the coil means to be delivered into the solution in order to affect the zeta potential of the solution in the desired.

In another embodiment of the invention, the shielding means and heat conducting means are integrally formed. In another embodiment of the invention, the shielding means and heat conducting means are fully enclosed within the housing.

In another embodiment of the invention, the heat conducting means and shielding means are integrally formed as a sleeve.

In another embodiment of the invention, the sleeve is fabricated from copper or aluminium or a metal alloy. It is of course understood that the metal sleeve can be made from any suitable metallic material or alloy known to the person skilled in the art.

In another embodiment of the invention, a mounting plate is arranged within the sleeve.

In another embodiment of the invention, the mounting plate is integral with the sleeve and fabricated from the same material as the sleeve.

In another embodiment of the invention, the coil means is arranged on a heat resistant plate located on one side of the mounting plate, and the electromagnetic signal generation circuitry is arranged on a spacer plate on another side of the mounting plate so that the heat generating components of the electromagnetic signal generation circuitry are maintained in contact with the mounting plate.

In this embodiment, the sleeve thus acts as a heat sink, drawing heat away from the circuitry. Use of the spacer plate ensures the circuitry, which is provided as a PCB board, is prevented from shorting against the mounting plate. In such an embodiment the PCB board is fully contained, isolated and insulated from the copper plate and coil with the exception of the heat generating components which are connected to the copper plate to provide heat sink for these components and the PCB which is connected to the coil via hexagonal stand-offs for delivery of the signal generated by the circuitry of a frequency of 27.225 MHz to the coil.

In another embodiment of the invention, the housing comprises a releasable closure or lid. Accordingly, the internal components in the housing, such as the coil, the circuitry and the like, are able to be accessed by simply removing the closure. If the unit breaks down and/or requires maintenance access can be easily gained. In the event that the internal components are damaged, then the housing and closure can also be recycled for use again.

In another embodiment of the invention, the housing and closure are fabricated from a non-conductive material, such as polyvinylchloride (PVC).

In another embodiment of the invention, the coil means is a conductive helical coil having a plurality of rungs, whereby the helical coil extends around a central support core which extends from the heat resistant plate. Optionally, the coil is fabricated from silver coated refrigeration tubing.

In another embodiment of the invention, the central support core is a tube mounting a plurality of coil support fins, each fin having a plurality of slots or grooves profiled to hold substantially rigidly at least some of the rungs of the coil. This ensures that the delivery apparatus has the required level of shock resistance necessary to ensure that the apparatus is not damaged as a result of solution turbulence, such as when the apparatus is positioned at or near a water inlet or bubbling area in the solution.

Preferably, each fin extends radially from the tube.

Advantageously, the electromagnetic signal delivered from the electromagnetic signal generation means is delivered as a constant un-pulsed signal.

Preferably, the frequency of the electromagnetic signal delivered from the electromagnetic signal generation means is 27.225 MHz.

In another embodiment of the invention, the voltage assembly means comprises a central voltage probe, a fluid chamber surrounding the probe and a non-conductive hollow outer housing. Preferably, the fluid in the probe is de-ionised water.

In another embodiment of the invention, the voltage assembly means is mounted via a conductive stand-off on a support rod which extends through the central support core.

In another embodiment of the invention, the conductive stand-off is screw threaded for engaging with a complimentary screw thread on the voltage probe. In this way the voltage assembly means is able to be securely mounted onto the stand-off so as to eliminate fluid leakage from the fluid filled probe.

In another embodiment of the invention, the delivery apparatus further comprises a feedback voltage aerial adapted to pick up a signal at the voltage assembly means and covert it to a feedback voltage which is transmitted to control circuitry of the delivery apparatus. Preferably, the control circuit is housed in a control panel unit.

Preferably, the feedback voltage aerial extends from the electromagnetic signal generation circuitry through the mounting plate.

In another embodiment of the invention, the control circuitry comprises a plurality of alarms which signal audibly and/or visibly when the feedback voltage is not within a predefined range.

In another embodiment of the invention, the control circuitry is coupled to telemetry means for transmitting data relating to operating parameters associated with the delivery apparatus, such as a malfunction of the delivery apparatus and/or whether the delivery apparatus is powered on and off.

In another embodiment of the invention, the data is transmitted to a mobile transceiver device as a text message. Such text messages serve to alert an operative to various operating parameters associated with the delivery apparatus and/or a malfunction of the delivery apparatus.

In another embodiment of the invention, the telemetry means is operative to control switching means in the control circuitry to control the on and off functioning of the delivery apparatus, whereby the delivery apparatus is adapted to be switched on and off by transmitting an electronic signal, such as a text message, to the telemetry means. In such an embodiment, an operative is able to switch the delivery apparatus on or off by sending a text message or other electronic signal to the telemetry means.

The control circuit also includes a plurality of LED's which are positioned on a control panel unit for visually displaying various operating parameters associated with the delivery apparatus, including a malfunction and/or whether the apparatus is on or off.

In another embodiment of the invention, the apparatus further comprises means enabling the location of the delivery apparatus to be determined. Preferably, the control means further comprises GSM technology to enable the location of the delivery apparatus to be determined by a remote monitoring means.

In another embodiment of the invention, the apparatus is at least partially submerged in the solution to deliver the magnetic field and the electric field into the solution. Alternatively, the apparatus may be fully submerged in the solution to deliver the magnetic field and the electric field into the solution. Preferably, the solution is water.

Preferably, the telemetry means is coupled with battery powered back up.

In another embodiment of the invention, electrical mains power powers the control circuit.

DETAILED DESCRIPTION OF THE INVENTION

The invention will be more clearly understood from the following description of some embodiments thereof, given by way of example only, with reference to the accompanying drawings, in which:

FIG. 1 is a schematic of a system incorporating a delivery apparatus according to the present invention submerged in a solution;

FIGS. 2*a* to 2*d* are perspective, bottom, side and top views of a housing for use with the delivery apparatus shown in FIG. 1;

FIGS. 3*a* to 3*c* are side, perspective and top views of various internal components of the delivery apparatus shown in FIG. 1;

FIGS. 4*a* to 4*e* are sectional, perspective and top views of a shielding means in the delivery apparatus shown in FIG. 1;

Figure 1:
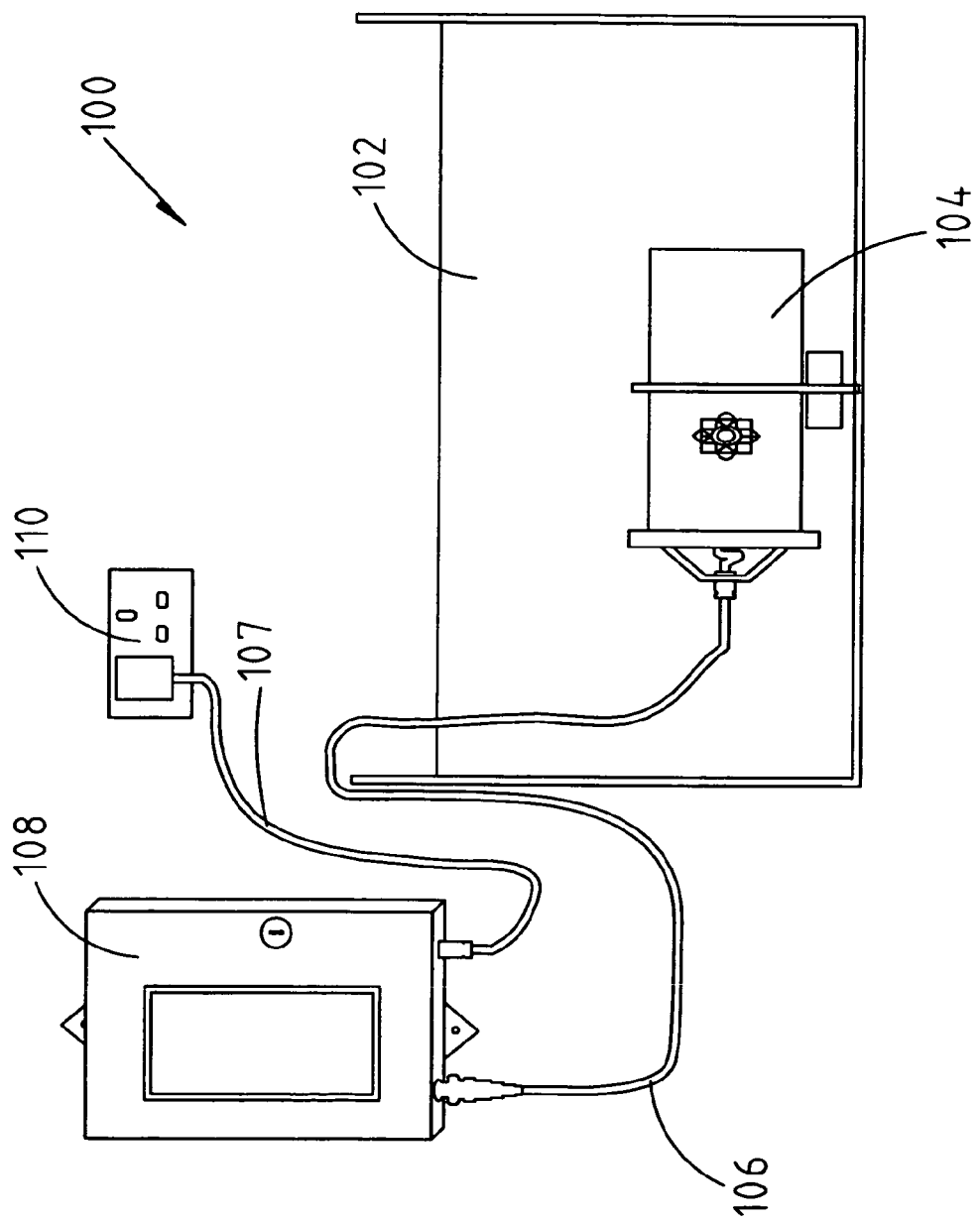
Figures 2A, 2B:
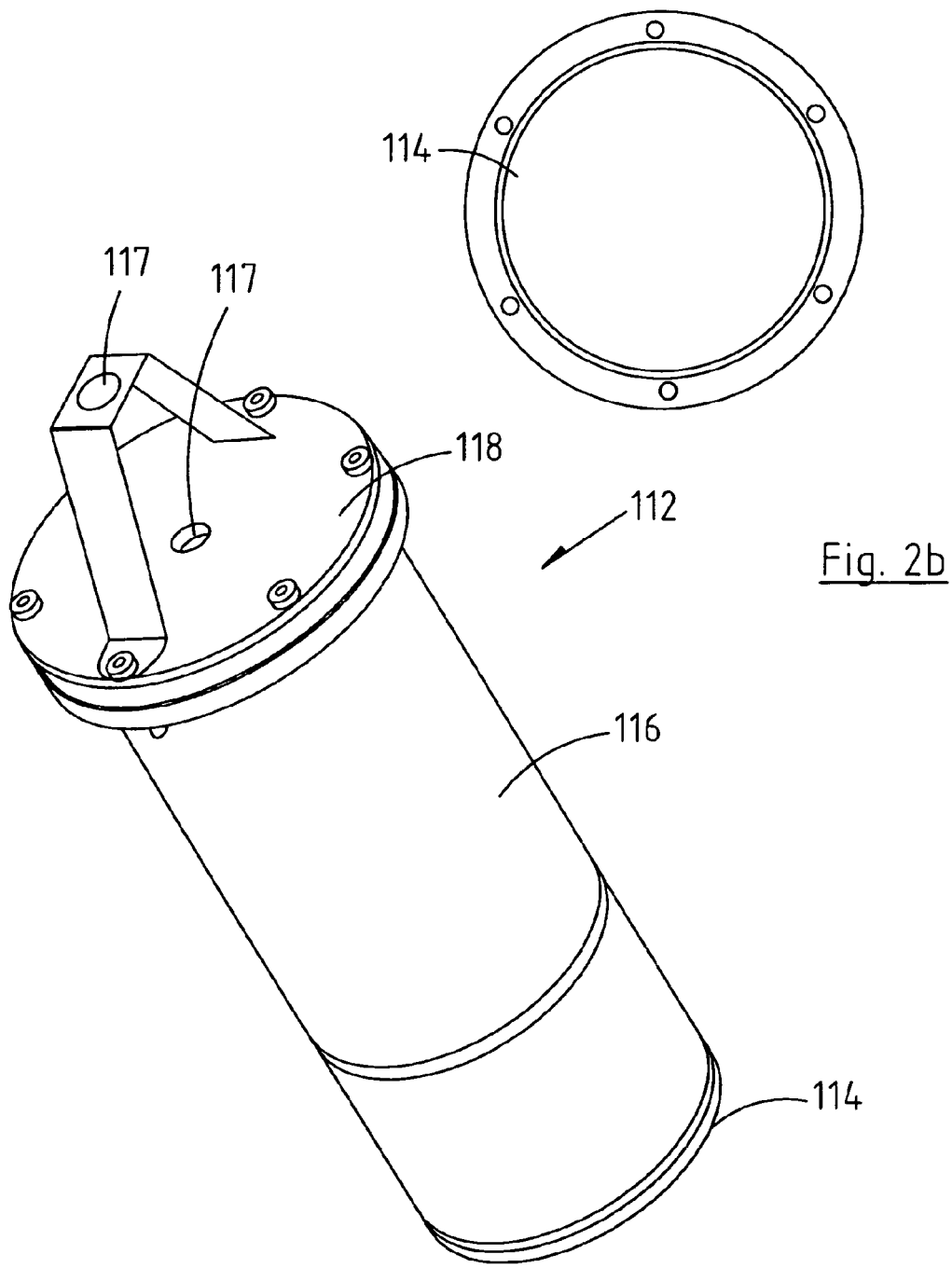
Figure 2C:
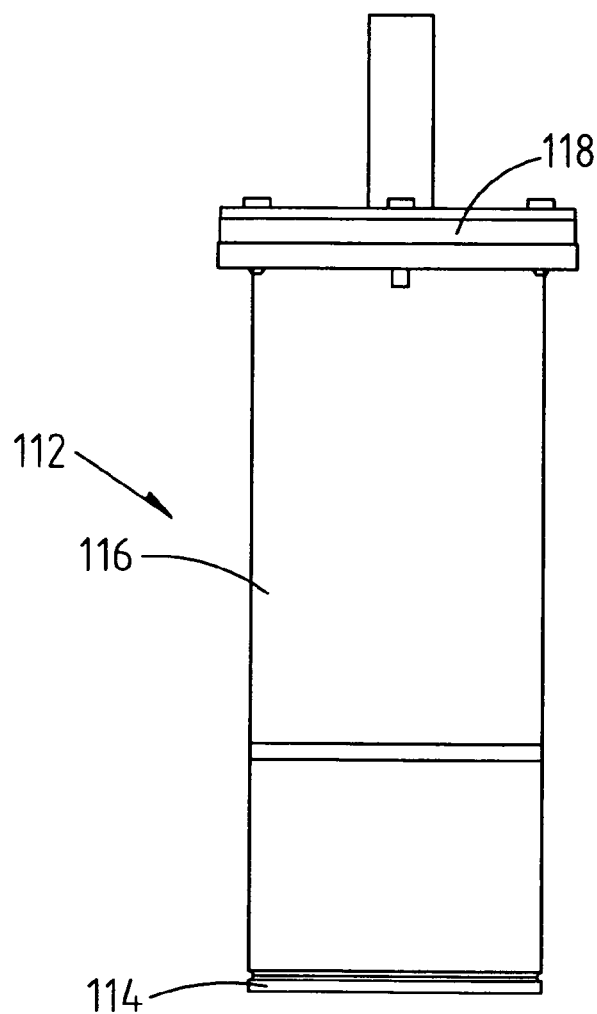
Figure 2D:
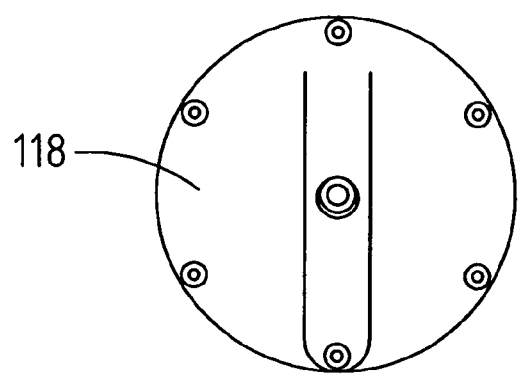

With reference to the diagrams, and initially to FIG. 1, there is shown a system 100 for delivering electromagnetic energy into a solution 102 using a delivery apparatus 104. The system 100 comprises transmission means in the form of cable 106 for delivering an electrical signal from a control circuit (see FIG. 7) housed in a control panel 108 to electromagnetic signal generation circuitry (see FIG. 4d) contained in the delivery apparatus 104. Electrical mains power is supplied from mains socket 110 via power cable 107 to the control circuit. The delivery apparatus 104 is driven by 24V DC power. The electromagnetic signal generation circuitry in the delivery apparatus 104 is configured to use electrical power transmitted from the control circuit to generate an electromagnetic signal able to be used by the delivery apparatus 104 for generating an magnetic field and an electric field for delivery into the solution 102. Characteristics of the solution 102, such as its zeta potential, may thus be modified by exposing the solution to the magnetic field and electric field generated. The frequency of the electromagnetic signal delivered from the electromagnetic signal generation means is approximately 27.225 MHz, and the electromagnetic signal delivered is a constant signal (that is, it is an un-pulsed signal).

FIGS. 2a to 2d show a housing 112 configured for the delivery apparatus 104 of FIG. 1. The housing 112 comprises a base 114 and a side wall 116 upstanding on the base 114. Also shown is a closure or lid 118 which is adapted to engage with the side wall 116 to close the housing 112. The housing 112 is fabricated from a non-conductive material, such as polyvinylchloride (PVC). The closure 118 is manufactured from conductive material (for example, stainless steel), but it may alternatively be fabricated from a non-conductive material, such as PVC. In the instance shown, the cable 106 (see FIG. 1) for delivering electrical power from the control circuit (not shown) in the control panel 108 passes through holes 117 in the closure 118 and is coupled to the electromagnetic signal generation circuitry (see FIG. 4d) in the delivery apparatus 104. The cable 106 is secured in the holes 117 by means of grommets or other suitable fasteners to provide a water tight seal. The internal components in the housing 112 are therefore able to be accessed by removing the closure 118. If the delivery apparatus 104 breaks down and/or requires maintenance access can thus be easily gained once the closure 118 has been removed. In the event that the internal components in the delivery apparatus 104 are damaged, then the housing 112 and closure 118 can be reused.

Figure 3A:
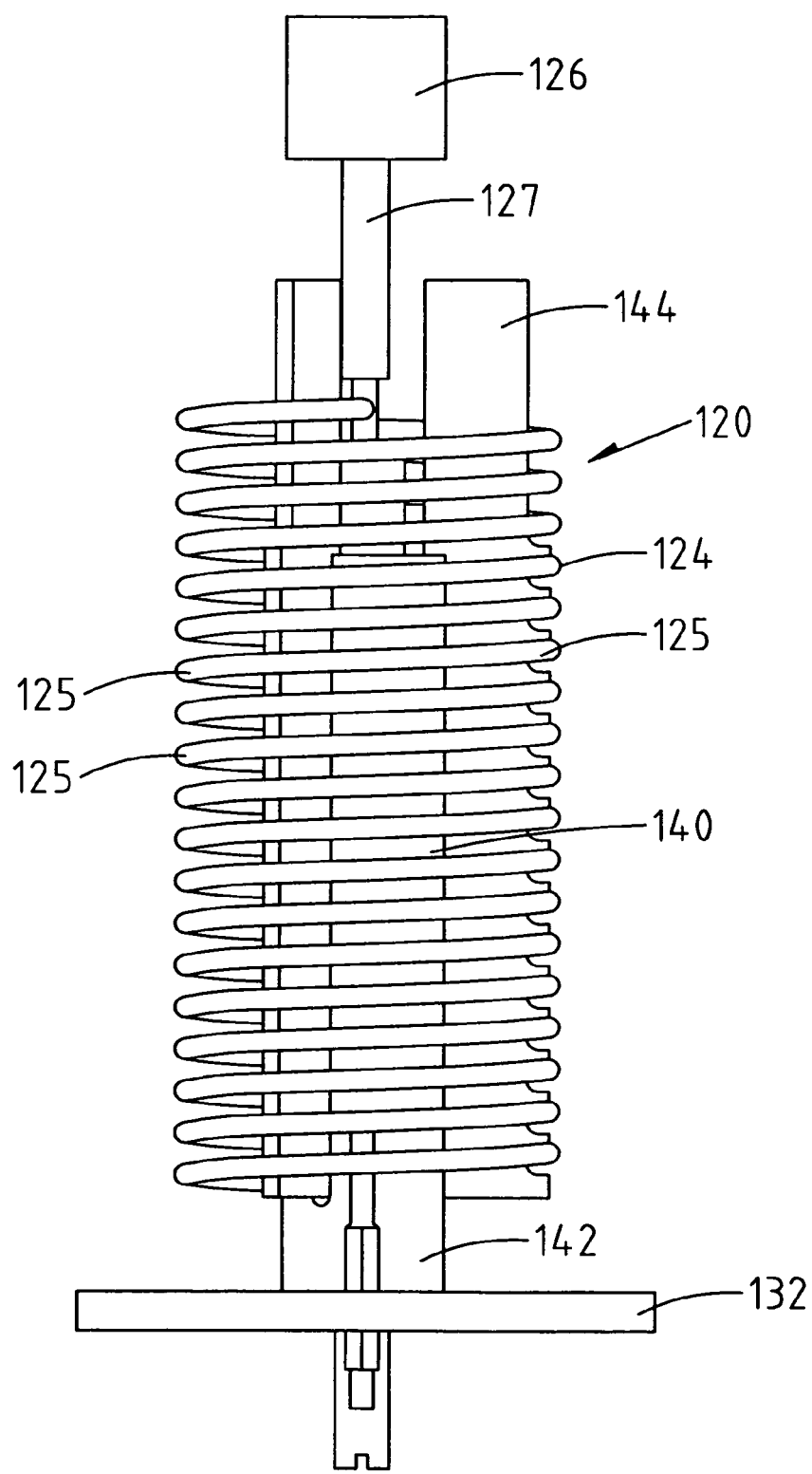
Figure 3B:
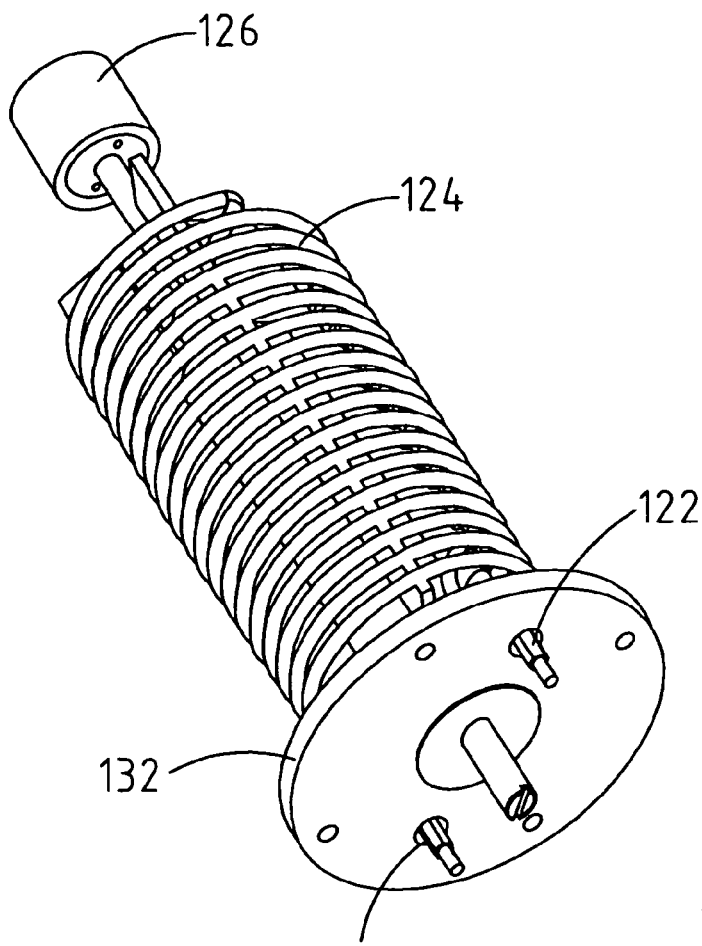
Figure 3C:
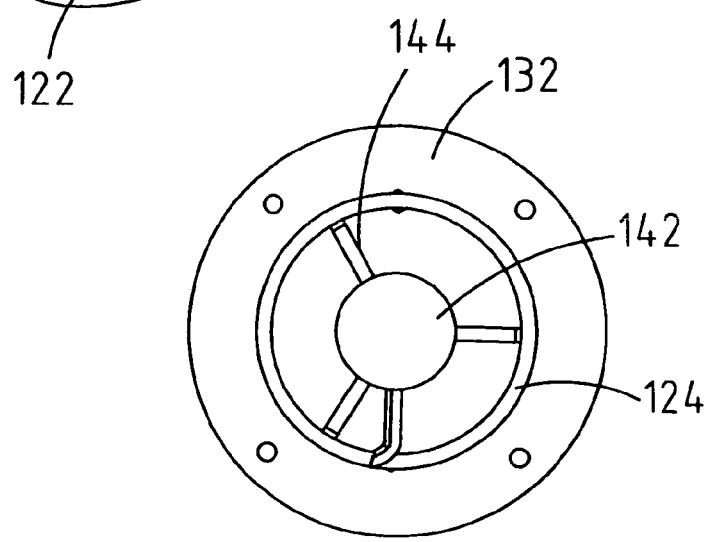

FIGS. 3a to 3c show the coil means 120, which in use, is arranged within the housing 112 for delivering a magnetic field into the solution 102. In the instance shown, the coil means 120 is a helical resonator coil 124 having a plurality of rungs 125. The coil 124 may be fabricated from a variety of suitable materials, such as silver coated refrigeration tubing. Also shown is a connection means 122 for coupling the coil 124 to electromagnetic signal generation circuitry so that an electromagnetic signal generated by the electromagnetic signal generation circuitry can delivered to the coil 124. Also shown is a voltage assembly means 126 (water module) which is arranged within the housing 112. The voltage assembly means 126 is mounted via a conductive stand-off 127 on a support core which is coupled to and extends through the coil 124 to provide a conductive path from the coil 124 to the voltage assembly means 126.

Figure 4A:
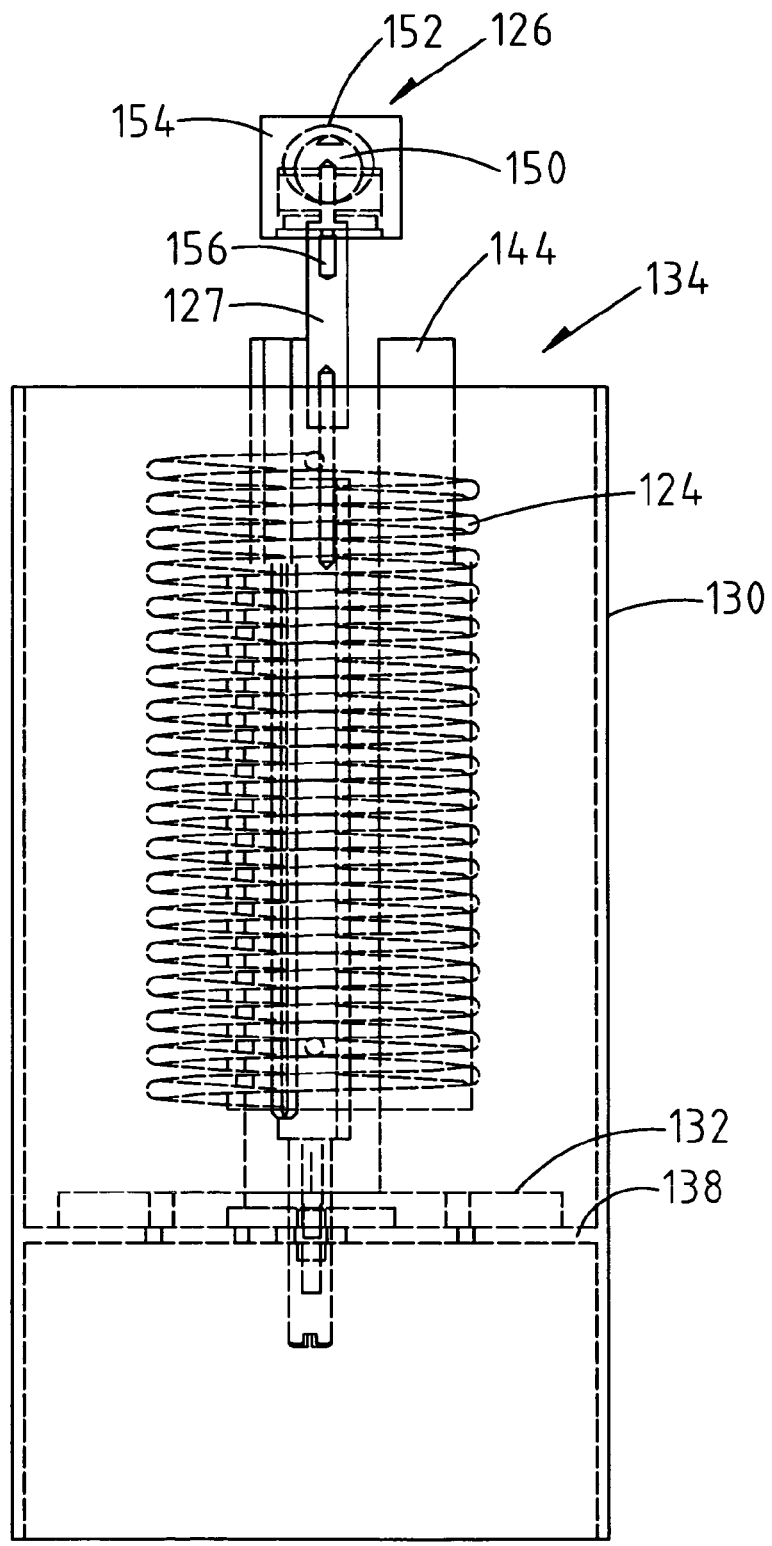
Figure 4B:
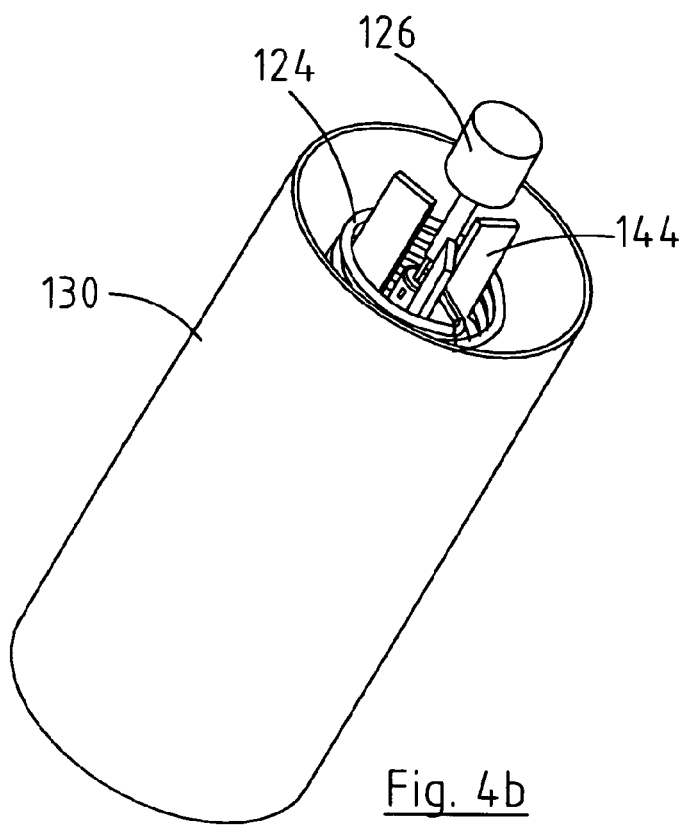
Figure 4C:
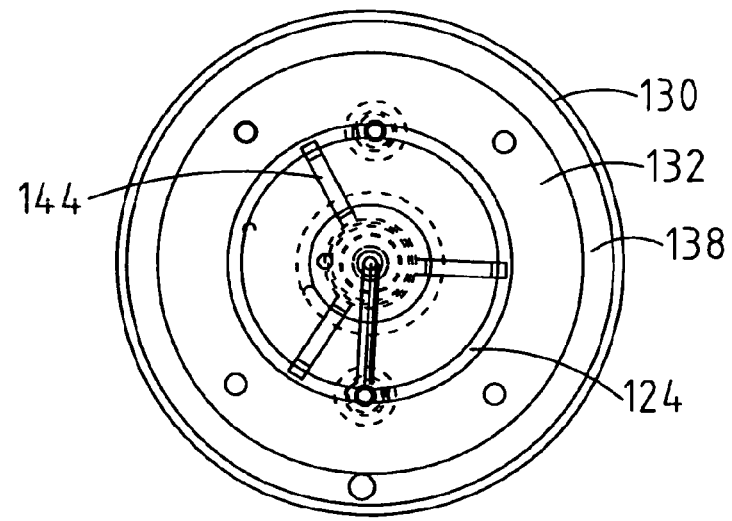

With reference to FIGS. 4a to 4c, the voltage assembly means 126 (water module) comprises a central voltage probe 150, which in the instance shown is provided as a gold plated brass ball, a fluid chamber 152 surrounding the probe 150 and a non-conductive hollow outer housing 154. The fluid in the chamber 152 is preferably de-ionised water. The conductive stand-off 127 is screw threaded for engaging with a complimentary screw thread on coupling means of the voltage assembly means 126. In this way, the voltage assembly means 126 is able to be securely mounted onto the stand-off 127 so as to eliminate fluid leakage from the fluid containing voltage assembly means 126.

Figure 4D:
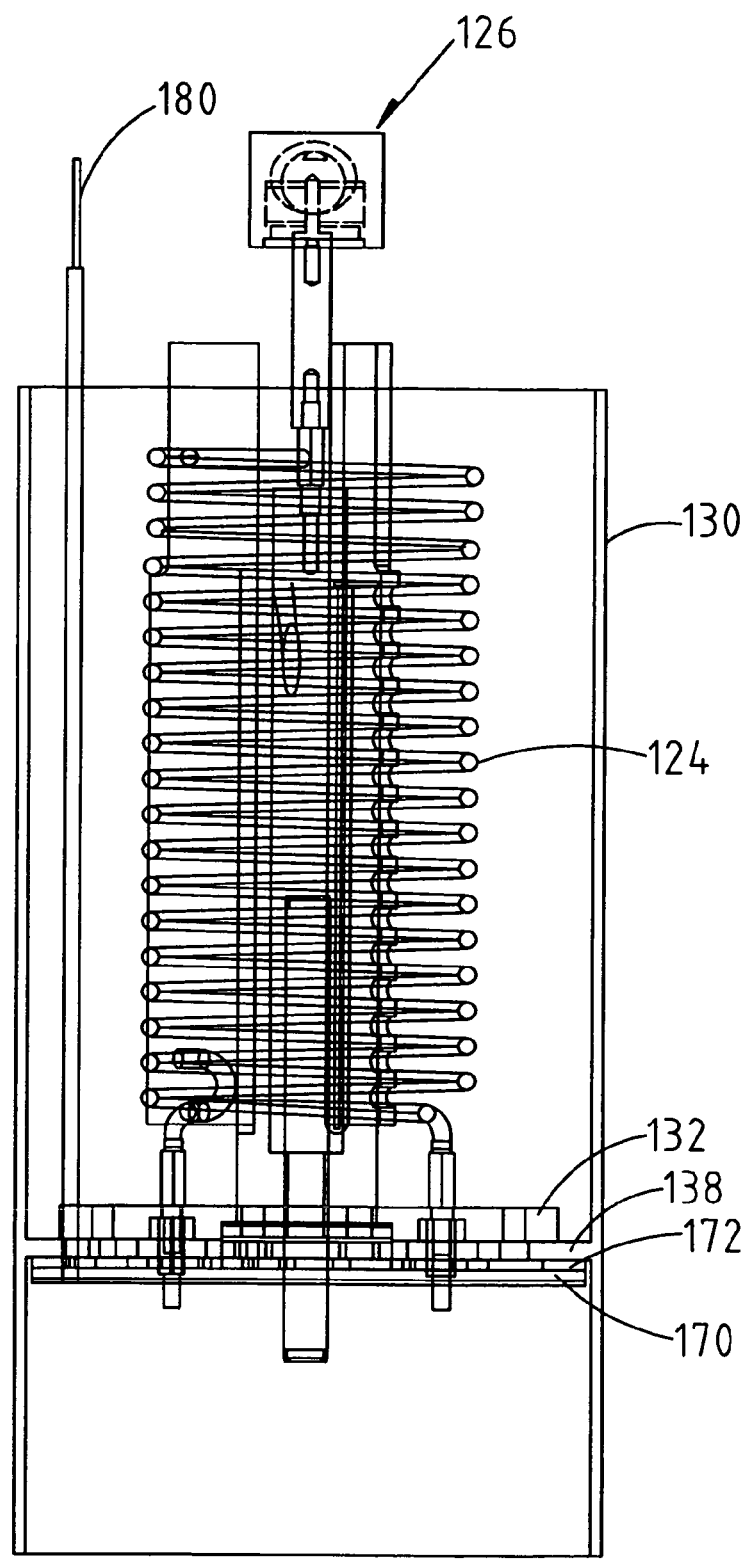
Figure 4E:
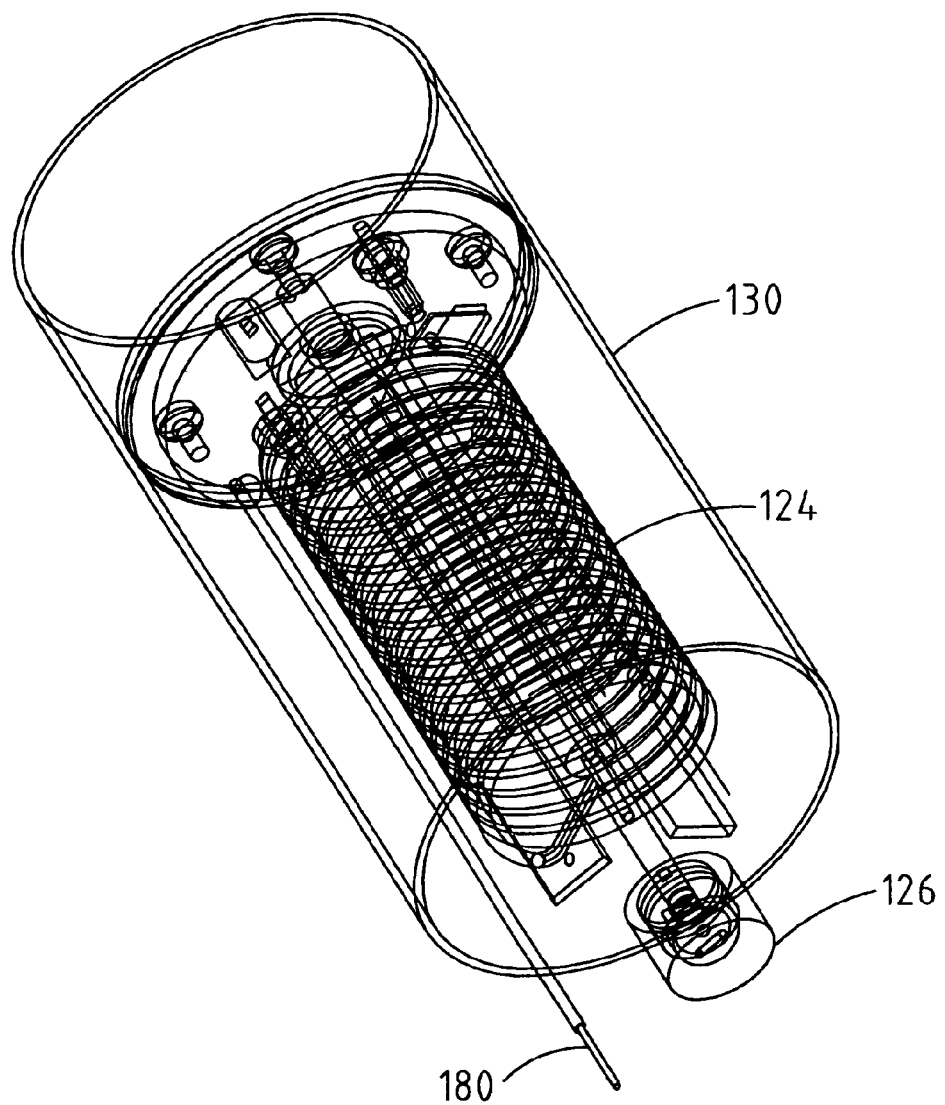
Figure 5:
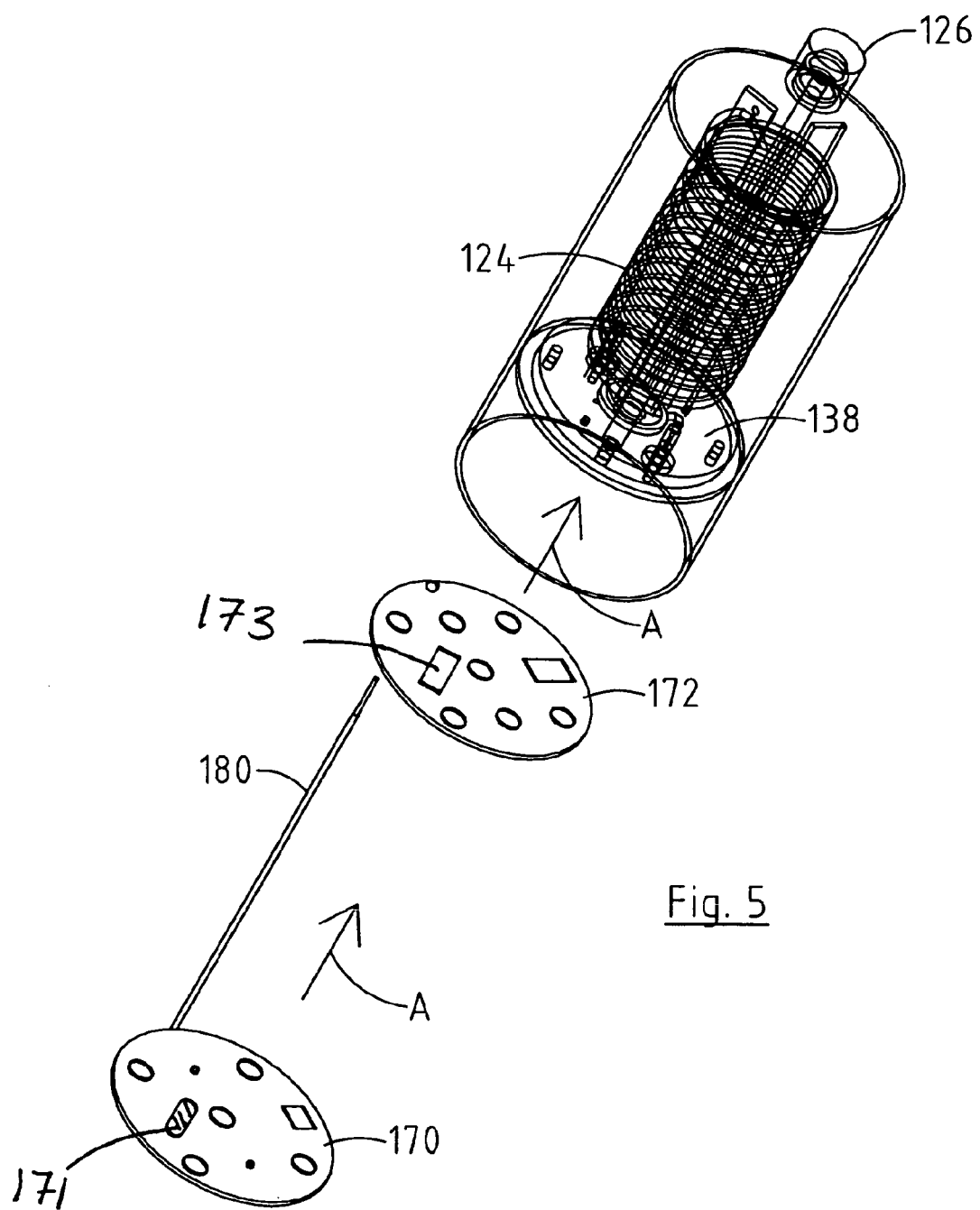
FIG. 5 is an exploded perspective view of a PCB and a spacer board for use with the delivery apparatus of FIG. 1.

With reference to FIGS. 4d to 4e and FIG. 5, the delivery apparatus further comprises electromagnetic signal generation circuitry, provided on a PCB circuit board 170 for generating an electromagnetic signal suitable for onward transmission to the coil 124 for generating a magnetic field and an electric field for delivery into the solution. It will be understood that mounted on the PCB board will be various heat generating components, such as FET transistors. The frequency of the electromagnetic signal delivered to the coil means 124 is 27.225 MHz.

As shown, the delivery apparatus 104 comprises a heat conducting means 130, 138 arranged within the housing 112 to conduct heat generated by those heat generating components, such as FET transistor 171, of the electromagnetic signal generation circuitry. The heat conducting means 130, 138 at least partially encloses the electromagnetic signal generation circuitry 170. The heat generating components of the electromagnetic signal generation circuitry 170, such as FET transistor 171, are placed in contact with the heat conducting means 138. This arrangement ensures that the heat conducting means 138 will act as a heat sink so that heat generated by the apparatus will be conducted away from the PCB board to thereby significantly reduce overheating of the apparatus and minimise the level of undesirable heat dissipation.

The heat conducting means 130 also acts as a shielding means, which is also indicated by the reference numeral 130, arranged within the housing to at least partially enclose the coil means 124 so as to shield the coil means 124 from electrostatic fields. The shielding means 130 contains the electric field along the full length of the coil 124.

In the instance shown, the heat conducting means and shielding means are integrally configured as a tubular metal sleeve which is fully enclosed within the housing 112. The metal sleeve 130 may be fabricated from copper or alternatively, from aluminium. It is of course understood that the metal sleeve 130 may be made from any suitable metallic material or alloy known to a person skilled in the art. A mounting plate 138 of the heat conducting means is included in the sleeve 130 intermediate the sleeves' ends. The mounting plate 138 is fabricated from the same material as the sleeve 130. The mounting plate 138 is also optionally formed integrally with the sleeve 130.

The coil means 124 is arranged on a heat resistant plate 132 which is positioned on one side of the mounting plate 138, and the electromagnetic signal generation circuitry 170 is arranged on a spacer plate 172 on the other side of the mounting plate 138. In the instance shown, the heat generating components 171 of the electromagnetic signal generation circuitry 170 extend through holes 173 of the spacer plate 172 so as to be placed in contact with the mounting plate 138 which thus acts as a heat sink, drawing heat away from the circuitry 170. Use of the spacer plate 172 prevents the circuitry 170 shorting against the mounting plate 138. The mounting plate 138 together with the sleeve 130 act as heat conducting means and together with the coil 124 are removable from the housing 112.

As shown, connection means 122 extends from the coil 124 through the heat resistant plate 132 and the spacer plate 172 to couple the coil 124 to electromagnetic signal generation circuitry 170. In this way an electromagnetic signal of a desired frequency, specifically 27.225 MHz, can be generated by the electromagnetic signal generation circuitry 170 and delivered to the coil 124. In such an embodiment the PCB board 170 is fully contained, isolated and insulated from the copper plate 138 and coil 124 with the exception of the heat generating components 171 which are connected to the copper plate 138 to provide heat sink for these components and the PCB 170 which is connected to the coil 124 via hexagonal standoffs (See FIG. 3c labelled as 122) for delivery of the signal generated by the circuitry 170 of a frequency of 27.225 MHz to the coil.

Figure 6:
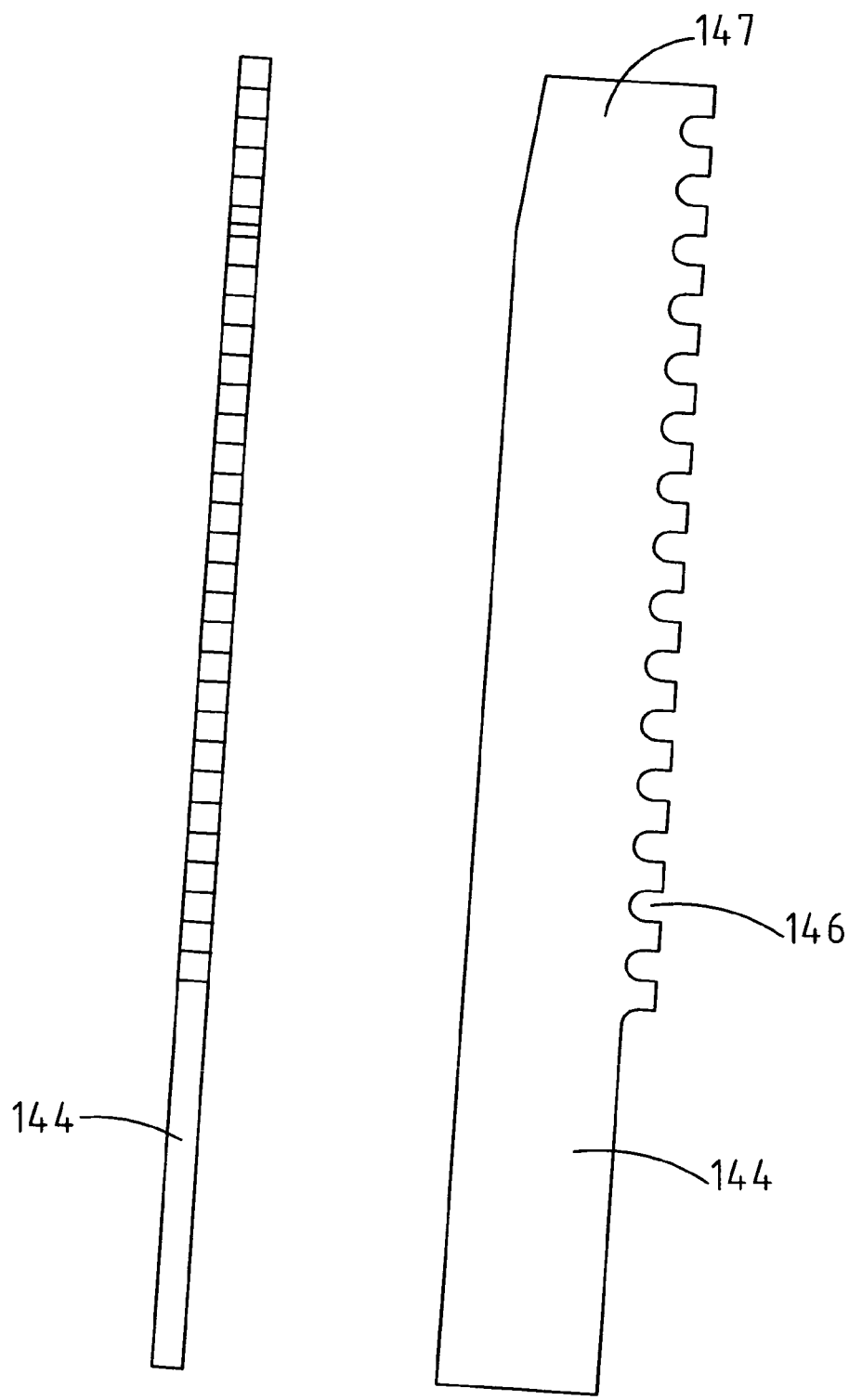
FIG. 6 is a side view of a coil support fin according to the invention.

The helical coil 124 winds around a central support core, indicated generally by the reference numeral 140 which extends through the heat resistant plate 132 and sits on the mounting plate 138. The central support core 140 comprises a tube 142 having a plurality of slits, each slit for locating a radially extending coil support fin 144 (see FIG. 6). Each fin 144 comprises a plurality of slots or grooves 146 which are profiled to hold substantially rigidly at least some or all of the rungs of the coil 124. An end 147 of the fin 144 is thus adapted to securely fit and engage with the tube 142. In the instance shown, the central support core 140 comprises three fins 144, although it will be understood that the core 140 may be adapted to include any number of fins 144 as desired or as required.

The delivery apparatus also comprises a feedback voltage aerial 180 which extends from the circuit board 170 mounting the electromagnetic signal generation circuitry. The aerial 180 extends through the spacer plate 172 and the mounting plate 138 and is arranged to pick up the signal at the voltage assembly means (water module) 126 and covert it to a feedback voltage which is transmitted to control circuitry (see FIG. 7) in the control panel 108. The board 170 and spacer plate 172 are assembled in the direction of the arrows marked A.

Figure 7:
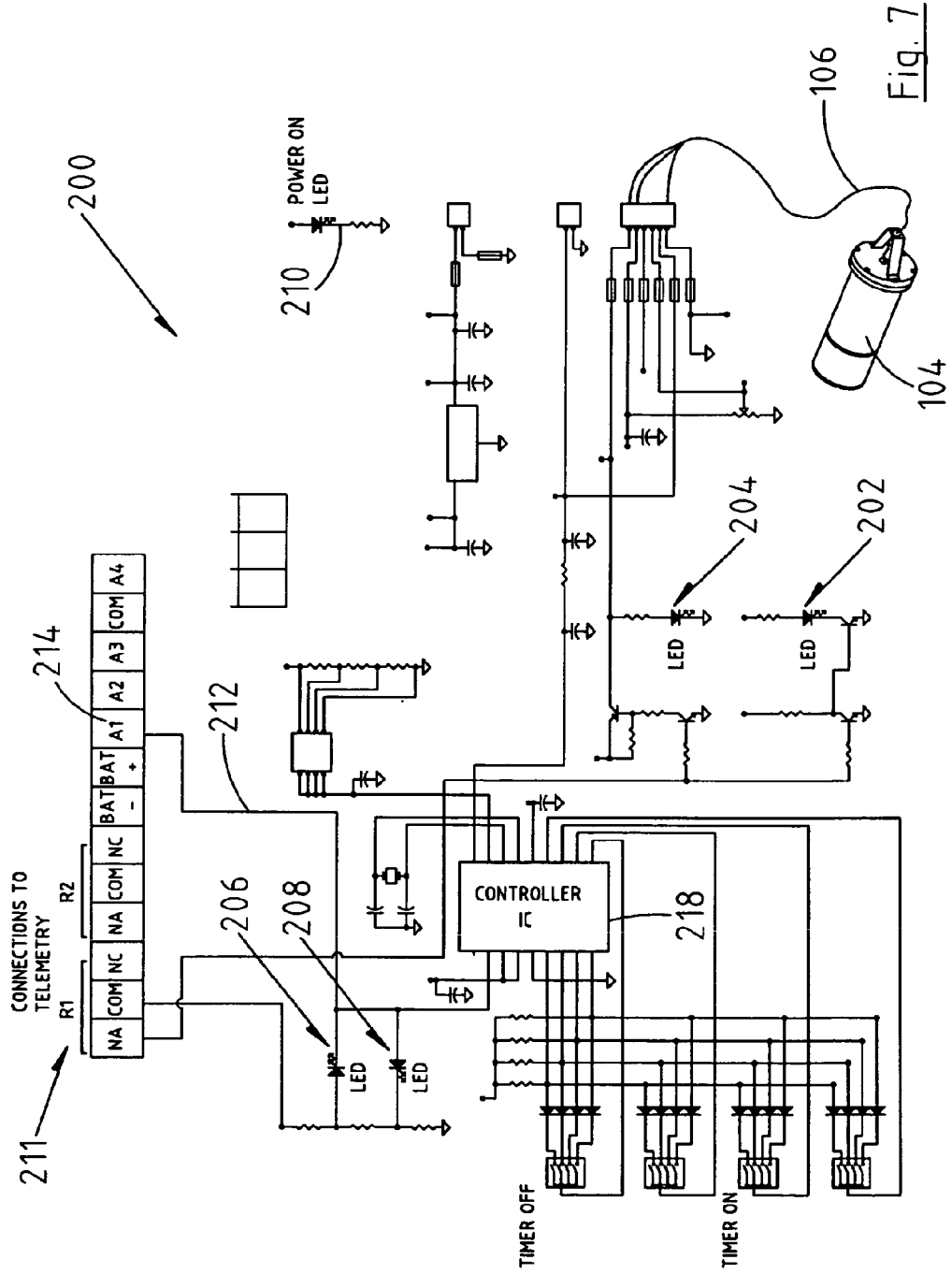
FIG. 7 is a combined block schematic and circuit diagram showing control circuitry for driving electromagnetic signal generation circuitry in the delivery apparatus of FIG. 1.

With reference to FIG. 7, there is shown control circuitry 200 for driving electromagnetic signal generation circuitry mounted in the delivery apparatus Transmission means in the form of cable 106 for delivering an electrical signal from the control circuit 200 to the electromagnetic signal generation circuitry (not shown) contained in the delivery apparatus 104 is also shown.

The control circuit 200 comprises a plurality of alarms, in the form of LED's 202, 204, 206, 208, 210 which illuminate on the control panel 108 to signal various operational aspects and warnings concerning the delivery apparatus. For example, when the feedback voltage is outside a predefined range, such as below a pre-determined value (1V), this is indicative of a fault or malfunction of the delivery apparatus. In response to this the control circuit 200 activates the LED 206. The control circuit 200 is coupled with telemetry means, the connections of which are indicated generally in FIG. 7 by the reference numeral 211. When LED 206 is on, then LED 208 is switched off and this is picked up on channel 212 and transmitted to connection A1 on the telemetry unit which is operative to transmit a text message to a mobile device to alert an operative to the malfunction. LED 210 is operative to indicate whether the control circuit is powered on or is switched off. The control circuit 200 may also be switched on and off remotely in order to thereby switch the delivery apparatus 104 on and off. By turning off R1 on telemetry means the delivery apparatus 104 may be switched off. When the delivery apparatus 104 is switched off, the LED 202 (orange light) is illuminated and LED 204 is off. When the delivery apparatus 104 is switched on, LED 204 (green light) is illuminated and LED 202 is off. R1 is thus a switch on the telemetry means that can optionally be turned on or off by sending a text from a mobile telephone, or other device with communications technology, to the telemetry means. Also shown in FIG. 7 is a pre-programmed chip 218 that processes the feedback voltage picked up by the feedback voltage aerial 180 in the delivery apparatus 104. The chip 218 computes whether the feedback voltage picked up by the aerial 180 is below a pre-determined voltage needed to be supplied by the delivery apparatus 104 to the solution 102. If the feedback voltage deviates from the predetermined voltage by more than 1V DC, this is indicative that a fault or malfunction has occurred with the delivery apparatus 104. The chip 218 will then send an appropriate signal to trigger the LED 206 indicating such a fault.

Figure 8:
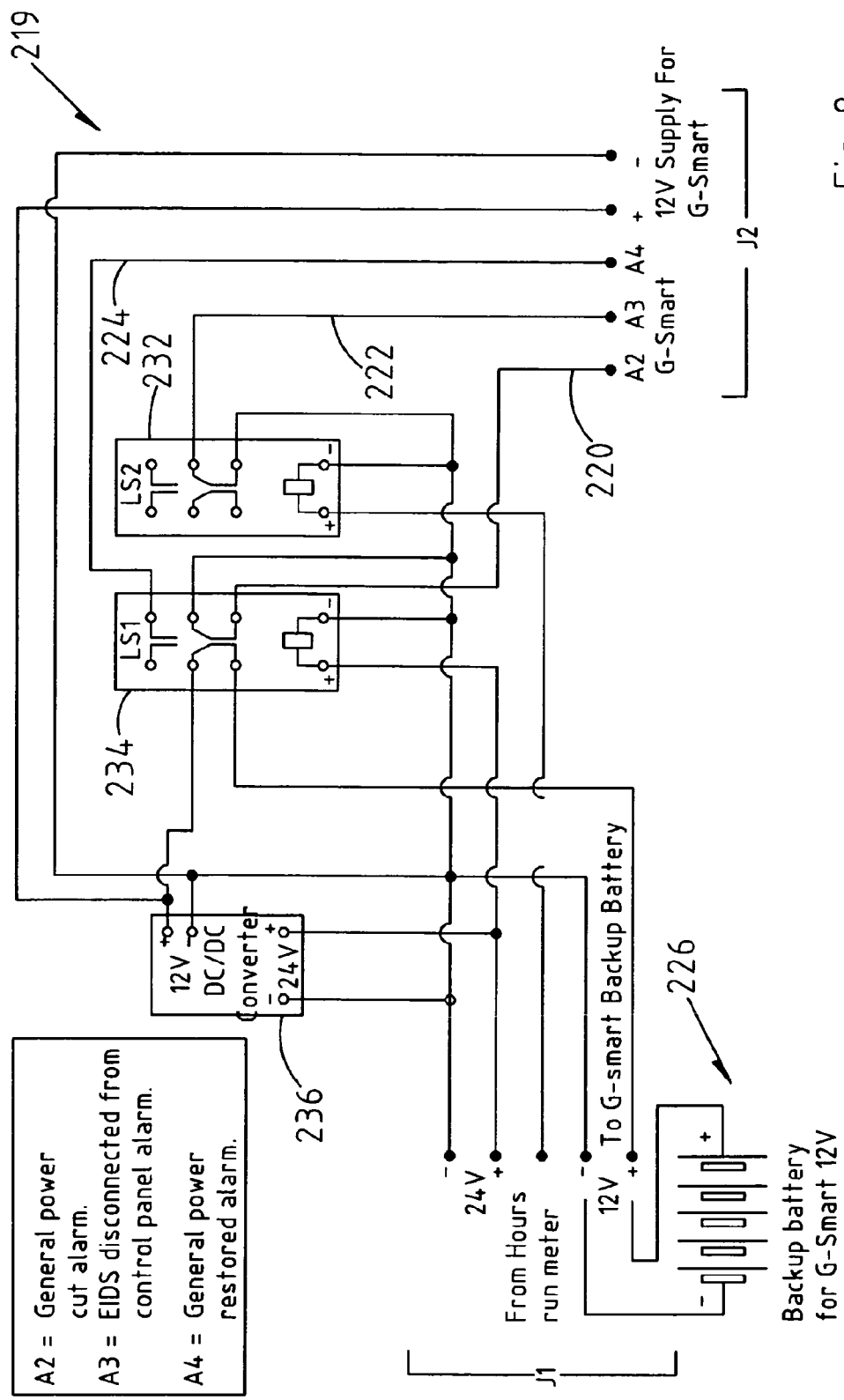
FIG. 8 is a schematic of an alarm triggering board coupled to the control circuitry shown in FIG. 7.

FIG. 8 is a schematic of an alarm triggering board 219 coupled to the control circuitry 200 shown in FIG. 7. FIG. 8 illustrates the various alarms utilised by the control circuit 200. In the instance shown, the alarm triggering board 219 is coupled to remote telemetry means which utilises GSM technology and communications means so that the various alarms 220, 222, 224 when triggered may be signalled to users in the form of text messages. In particular, alarm channel 220 is adapted to transmit a signal to a user via text messaging that a power cut resulting in the loss of power to the delivery apparatus 104 has occurred. Accordingly, a user will be notified remotely by the telemetry means of such a fault. Similarly, alarm channel 222 is adapted to transmit a signal that the delivery apparatus 104 has been disconnected from the control panel 108. The telemetry means thus transmits this signal to a user's mobile telephone via a text message. Alarm channel 224 signals when mains power has been restored to the delivery apparatus 106 following earlier dislocation in power supply. The telemetry means is also coupled to a battery powered back up 226. Also shown are relay switches 232, 234 which connect the alarm channels 220, 222, 224 to ground to thereby facilitate triggering of the alarms when required for the telemetry means. A DC power converter 236 is also provided for converting the 24V DC power supplied to the delivery apparatus 106 from the mains power to the 12V required for the telemetry means.

Figure 9:
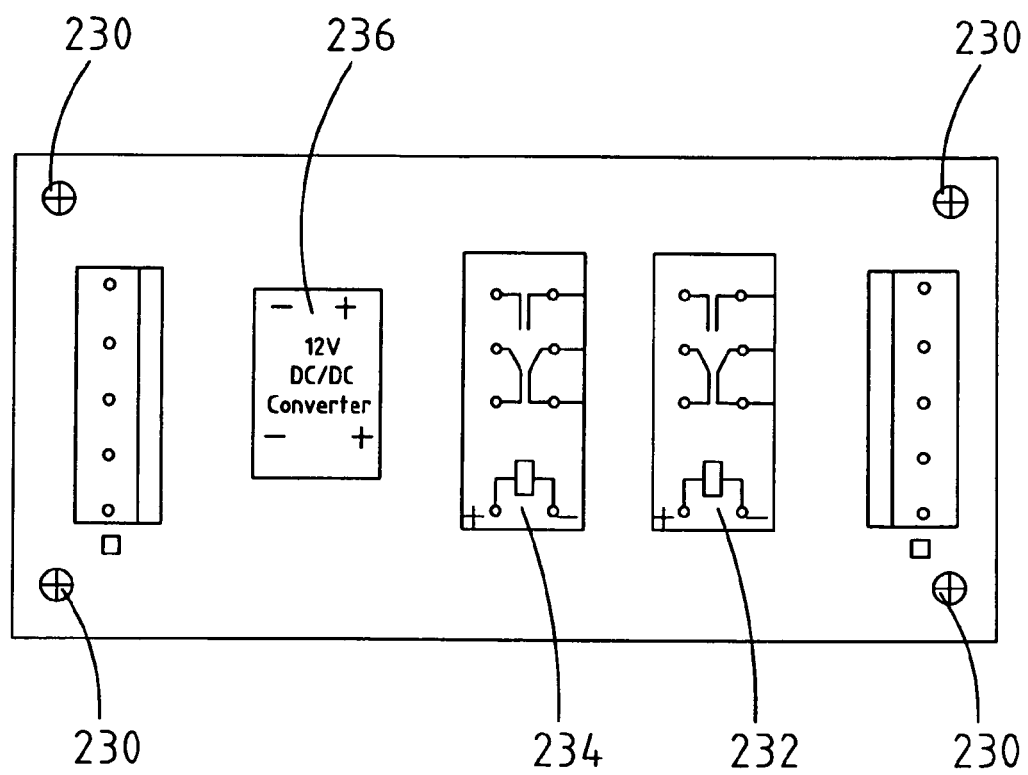
FIG. 9 is a PCB board corresponding to the schematic in FIG. 8.

The telemetry means comprises means for controlling switching means in the control circuit operable to control the on and off functioning of the delivery apparatus 104. In this way a user is able to switch the delivery apparatus 104 on or off by sending a text message or other electronic signal to the telemetry means. The GSM technology further enables the location of the delivery apparatus 104 to be determined. FIG. 9 is a PCB board corresponding to the schematic in FIG. 8. Shown on the PCB board are mounting holes 230 to enable the board to be secured inside the control panel 108.

Aspects of the present invention have been described by way of example only and it should be appreciate that additions and/or modifications may be made thereto without departing from the scope thereof as defined in the appended claims.

The invention claimed is:
1. A delivery apparatus (104) for delivering electromagnetic energy into a solution (102), the delivery apparatus (104) comprising:

an outer housing (112);
electromagnetic signal generation circuitry (170) contained within the housing (112) and having heat generating components (171);
a coil (124) arranged within the housing (112) to deliver a magnetic field into the solution (102);
a voltage assembly (126) coupled to the coil (124) to deliver an electric field into the solution (102), the voltage assembly (126) comprising a central voltage probe (150), a fluid chamber (152) surrounding the central voltage probe (150) and a non-conductive hollow outer housing (154);
a connecting device (122) extending from the coil (124) in order to couple the coil (124) to the electromagnetic signal generation circuitry (170) so as to allow an electromagnetic signal generated by the electromagnetic circuitry (170) to be delivered to the coil (124);
characterised in that the delivery apparatus (104) further comprises:
a heat conducting device arranged within the outer housing (112) and comprising a sleeve (130) and a mounting plate (138) arranged within the sleeve (130), wherein the sleeve (130) and the mounting plate (138) are integrally formed and wherein the sleeve (130) is arranged to at least partially enclose the coil (124) so as to shield the coil (124) from electrostatic fields, and
wherein the heat conducting device is in contact with the heat generating components (171) of the electromagnetic signal generation circuitry (170) so as to conduct heat generated by the heat generating components (171) away from the electromagnetic signal generation circuitry (170).

2. The delivery apparatus (104) according to claim 1 wherein the sleeve (130) is fabricated from a metal chosen from the group comprising copper, aluminium and a metal alloy.

3. The delivery apparatus (104) according to claim 1 wherein the mounting plate (138) is fabricated from the same material as the sleeve (130).

4. The delivery apparatus (104) according to claim 1 wherein the coil (124) comprises a conductive helical coil having a plurality of rungs (125), whereby the helical coil extends around a central support core (140) which extends from the heat resistant plate (132), wherein the central support core (140) comprises a tube (142) mounting a plurality of coil support fins (144), each fin (144) having a plurality of slots or groves (146) profiled to hold at least some of the rungs (125) substantially rigid.

5. The delivery apparatus (104) according to claim 4 wherein the voltage assembly (126) is mounted via a conductive stand-off (127) on a support rod which extends through the central core (140), and wherein the conductive stand-off (127) is screw threaded for engagement with a complimentary screw thread on the voltage probe (150).

6. The delivery apparatus (104) according to claim 1 wherein the housing (112) comprises a releasable closure or lid (118).

7. The delivery apparatus (104) according to claim 6 wherein the housing (112) and closure (118) are fabricated from a non-conductive material.

8. The delivery apparatus (104) according to claim 4 wherein the electromagnetic signal generation circuitry (170) is configured to generate constant un-pulsed signals.

9. A delivery apparatus (104) according to claim 1 wherein the delivery apparatus (104) further comprises a feedback voltage aerial (180) and control circuitry (200), wherein the control circuitry (200) is configured to drive the electromagnetic signal generation circuitry (170) and wherein the feedback voltage aerial (180) is configured to pick up a signal at the voltage assembly (126) and convert it to a feedback voltage which is transmitted to the control circuitry (200), and wherein the control circuitry (200) comprises a plurality of alarms that signal audibly and/or visibly when the feedback voltage is not within a predefined range.

10. The delivery apparatus (104) according to claim 9 wherein the control circuitry (200) is coupled to a telemetry device means for transmitting data relating to operating parameters associated with the delivery apparatus (104), wherein the operating parameters include a malfunction of the delivery apparatus (104) and whether the delivery apparatus (104) is powered on and off.

11. The delivery apparatus (104) according to claim 10 wherein the telemetry device is operative to a control switching circuit in the control circuitry (200) to control the on and off functioning of the delivery apparatus (104), whereby the delivery apparatus (104) is adapted to be switched on and off by transmitting an electronic signal to the telemetry device.

12. The delivery apparatus (104) according to claim 1 wherein the mounting plate (138) comprises a first side and an opposite second side, the delivery apparatus (104) further comprising:
a heat resistant plate (132) located on the first side of the mounting plate (138), wherein the coil (124) is arranged on the heat resistant plate (132); and
a spacer plate (172) located on the opposite second side of the mounting plate (138) and having at least one hole (173), the electromagnetic signal generation circuitry (170) being arranged on the spacer plate (172) so the heat generating components (171) of the electromagnetic signal generation circuitry (170) extend through the at least one hole (173) and contact the mounting plate (138), wherein the spacer plate (172) prevents the electromagnetic signal generation circuitry (170) from shorting against the mounting plate (138).

13. The delivery apparatus (104) according to claim 7 wherein the non-conductive material is polyvinylchloride (PVC).

14. The delivery apparatus (104) according to claim 11 wherein the electronic signal is a text message.

15. A delivery apparatus (104) for delivering electromagnetic energy into a solution (102), the delivery apparatus (104) comprising:
an outer housing (112);
electromagnetic signal generation circuitry (170) within the housing (112) and having heat generating components (171);
a coil (124) arranged within the housing (112) to deliver a magnetic field into the solution (102);
a voltage assembly (126) coupled to the coil (124) to deliver an electric field into the solution (102), the voltage assembly (126) comprising a central voltage probe (150), a fluid chamber (152) surrounding the central voltage probe (150) and a non-conductive hollow outer housing (154);
a connecting device (122) extending from the coil (124) in order to couple the coil (124) to the electromagnetic signal generation circuitry (170) so as to allow an electromagnetic signal generated by the electromagnetic signal generation circuitry (170) to be delivered to the coil (124);
a heat conducting device arranged within the outer housing (112) to conduct heat generated by the heat generating components (171) away from the electromagnetic signal generation circuitry (170), the heat conducting device comprising a sleeve (130) and a heat sink mounting plate (138) arranged within the sleeve (130), the heat sink mounting plate (138) having a first side and an opposite second side, the sleeve (130) and the heat sink mounting plate (138) being integrally formed, the sleeve (130) being arranged to at least partially enclose the coil (124) so as to shield the coil (124) from electrostatic fields;

a heat resistant plate (132) located on the first side of the heat sink mounting plate (138), wherein the coil (124) is arranged on the heat resistant plate (132); and a spacer plate (172) located on the opposite second side of the heat sink mounting plate (138) and having at least one hole (173), the electromagnetic signal generation circuitry (170) being arranged on the spacer plate (172) so the heat generating components (171) of the electromagnetic signal generation circuitry (170) extend through the at least one hole (173) and contact the heat sink mounting plate (138) so that the heat sink mounting plate (138) draws heat away from the electromagnetic signal generation circuitry (170), and wherein the spacer plate (172) prevents the electromagnetic signal generation circuitry (170) from shorting against the mounting plate (138).

\* \* \* \* \*